United States Patent [19]

Lyons

[11] Patent Number: 5,335,157
[45] Date of Patent: * Aug. 2, 1994

[54] ANTI-COLLISION LIGHT ASSEMBLY

[75] Inventor: Harold W. Lyons, Killingworth, Conn.

[73] Assignee: Whelen Technologies, Inc., Chester, Conn.

[*] Notice: The portion of the term of this patent subsequent to Jul. 27, 2010 has been disclaimed.

[21] Appl. No.: 9,021

[22] Filed: Jan. 26, 1993

Related U.S. Application Data

[63] Continuation-in-part of Ser. No. 817,581, Jan. 7, 1992, Pat. No. 5,230,560.

[51] Int. Cl.⁵ ............................................. F21V 13/04
[52] U.S. Cl. ................................ 362/297; 362/309; 362/310; 362/337; 362/363
[58] Field of Search ............... 362/297, 186, 308, 309, 362/310, 337, 339, 340, 327, 328, 329, 346, 363

[56] References Cited

U.S. PATENT DOCUMENTS

| | | | |
|---|---|---|---|
| 1,877,785 | 9/1932 | Andrews | 362/186 |
| 1,904,248 | 4/1933 | Pixley et al. | 362/186 |
| 2,344,221 | 3/1944 | Trautner | 362/297 |
| 3,253,276 | 5/1966 | Nagel | 362/337 |
| 4,969,074 | 11/1990 | Davis et al. | 362/329 |

Primary Examiner—Richard R. Cole
Attorney, Agent, or Firm—Chilton, Alix & Van Kirk

[57] ABSTRACT

A compact and highly efficient warning light for producing high intensity light pulses which are radiated in accordance with a desired directional pattern includes a light source and a pair of reflectors disposed within a lens cover. The reflectors each include plural parabolic reflective surfaces distributed about an axis with the surfaces having a common focal point located on the axis. The two reflectors are coaxial and the common focal points of the surfaces thereof coincide.

20 Claims, 5 Drawing Sheets

ANTI-COLLISION LIGHT ASSEMBLY

CROSS-REFERENCE TO RELATED APPLICATION

This application is a continuation-in-part of application Ser. No. 07/817,581 filed Jan. 7, 1992, now U.S. Pat. No. 5,230,560.

BACKGROUND OF THE INVENTION

The present invention relates to warning lights and particularly to collision avoidance lights having no moving parts which are suitable for use on aircraft and other vehicles. More specifically, this invention is directed to a compact and efficient device for producing highly visible flashes of light and especially to a light assembly wherein light generated by a flash tube or incandescent lamp is directed, in part by reflection and in some embodiments also in part by refraction, so as to provide the optimum radiation pattern for the intended use. Accordingly, the general objects of the present invention are to provide novel and improved apparatus of such character.

2. Description of the Prior Art

While not limited thereto in its utility, the present invention is particularly well suited for use as a replacement for the rotating beacon type of light which has found widespread usage as an anti-collision warning on aircraft. Such rotating beacons typically comprise a constantly energized lamp and a rotating or oscillating mirror, the lamp and mirror being covered by a transparent dome or lens which may also function to redirect all or a portion of the generated light. Movement of the mirror causes the light generated by the lamp to appear to an observer to be flashing. Since a rotating beacon requires a motor and other moving parts, such lights inherently have a service life which is short when compared to lights with no moving parts. Accordingly, relatively frequent periodic maintenance or replacement is required of rotating beacon type anti-collision lights.

A collision avoidance light for aircraft usage, and the same requirement is imposed by emergency land and water vehicle applications, must provide a highly visible warning signal. The requirement for high visibility dictates that the light which is produced be characterized by high intensity and appear to an observer as flashes or pulses. The generation of such high intensity light pulses, however, must be accomplished without imposing unduly large power consumption requirements on the vehicle's electrical system. Power consumption requirements aside, there is a limit to the amount of light which can be generated by a given source such as, for example, a halogen lamp or a gaseous discharge tube. Obviously, the brighter the light which is generated, the better the anti-collision function will be performed. The requirement of high intensity light pulses coupled with the limitations of the light sources and the need for reasonable power consumption dictates that the energy in the visible spectrum which is generated by a given source be used as efficiently as possible. Accordingly, the generated light must be collected and directed so as to maximize visibility taking the particular use environment into account. In the case of an aircraft collision avoidance warning, the requisite radiation pattern is defined by FAA Specification FAR PART-23,1401 and PART 25,1401 and 91.33(c).

There has been a long standing desire for a compact and efficient light, capable of employing either a gaseous discharge tube or a halogen lamp as the light source, which meets the above-referenced FAA Specification and is capable of installation on aircraft either as original equipment or as a replacement for an existing rotating beacon type anti-collision light. While collision avoidance lights having no moving parts have previously been available, these prior lights could not be installed in place of an existing rotating beacon without difficult and expensive rewiring and, in any event, the prior lights were relatively inefficient in their use of the generated light energy and/or in the consumption of electrical power.

SUMMARY OF THE INVENTION

The present invention overcomes the above-briefly discussed and other deficiencies and disadvantages of the prior art and, in so doing, provides compact and highly efficient means for generating high intensity light pulses which are radiated in accordance with a desired directional pattern. A light in accordance with the present invention may employ, as the light source, either a gaseous discharge tube or an incandescent lamp such as, for example, a halogen lamp. The light source is housed within a lens cover which defines an axis and the source is positioned such that a point within the light emission region thereof lies on that axis. The lens cover has a generally smooth outer surface whereby the lens cover may be easily cleaned and will not be subject to diminished light transmission because of an accumulation of dirt in surface irregularities. The lens cover, in accordance with a first embodiment of the invention, is provided with a pair of spaced arrays of prismatic inner optics which directly receive and refract light emitted from the source. The lens cover of this first embodiment also has regions, including an intermediate portion located between the arrays of prismatic inner optics, through which light will pass without significant redirection.

At least a first multi-quadrant reflector is positioned within the lens cover at the lower end thereof. This reflector is coaxial with the lens cover and includes plural reflective surfaces arranged in a symmetrical, outwardly sloped pattern. Each of these individual reflective surfaces portions of a surface of a paraboloid of revolution. In another embodiment, these parabolic shapes are segments of a parabolic trough. The plural reflective surfaces of each reflector all have a common focal point which is located on the axis of the lens cover at a point within the light emission region of the source. In some embodiments of the invention, a second similar reflector will be positioned within the lens cover so as to be oppositely disposed from and facing the first reflector. When two reflectors are employed, the common focal points of both reflectors are generally coincident. Restated, the focal points of all of the individual parabolic reflective surfaces will lie on the axis of the lens cover and within the light emission zone of the light source as defined by the filament of an incandescent lamp or approximately the midpoint of the active portion of a gaseous discharge tube. Thus, in accordance with the well known properties of a parabolic reflector, a substantial portion of the light emanating from the source, i.e., the light which is incident upon the reflectors, will be radiated in directions which are generally transverse to the axis of the lens cover. In the first embodiment of the invention, which employs inner optics on the lens cover, the majority of the reflected light will pass through regions of the lens cover which are not provided with refracting inner optics. In accordance with another embodiment of the invention which has no internal optics, all of the reflected light will pass through the lens cover without redirection. The combination of the reflector(s) and the location of the light source relative to the reflector(s), and also relative to the inner optics when provided, produces the desired radiation pattern and, most importantly, makes highly efficient use of the available light energy.

In accordance with an embodiment of the invention which typically will not employ inner optics on the lens cover, the lens cover will be aerodynamically shaped and the second or upper multi-segmented reflector will be integral with the cover. This integral reflector is formed by molding the reflector base as part of the lens cover and subsequently metalizing the multiple parabolic surfaces thereof.

When a light assembly in accordance with the present invention employs an incandescent lamp as the light source, in some embodiment, the circuitry for causing the lamp to be periodically energized may be housed in the base of the light assembly. This base, in part, includes a cavity defined by the first or lower one of the multi-quadrant reflectors. Accordingly, such a light assembly may be installed directly in place of an existing rotating beacon and will operate from the same two conductor electrical cable which supplied power to the lamp and motor of the rotating beacon. When a light in accordance with the present invention utilizes a gaseous discharge tube, the trigger transformer for the tube may be installed within the base of the light assembly.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENTS

Figure 1:
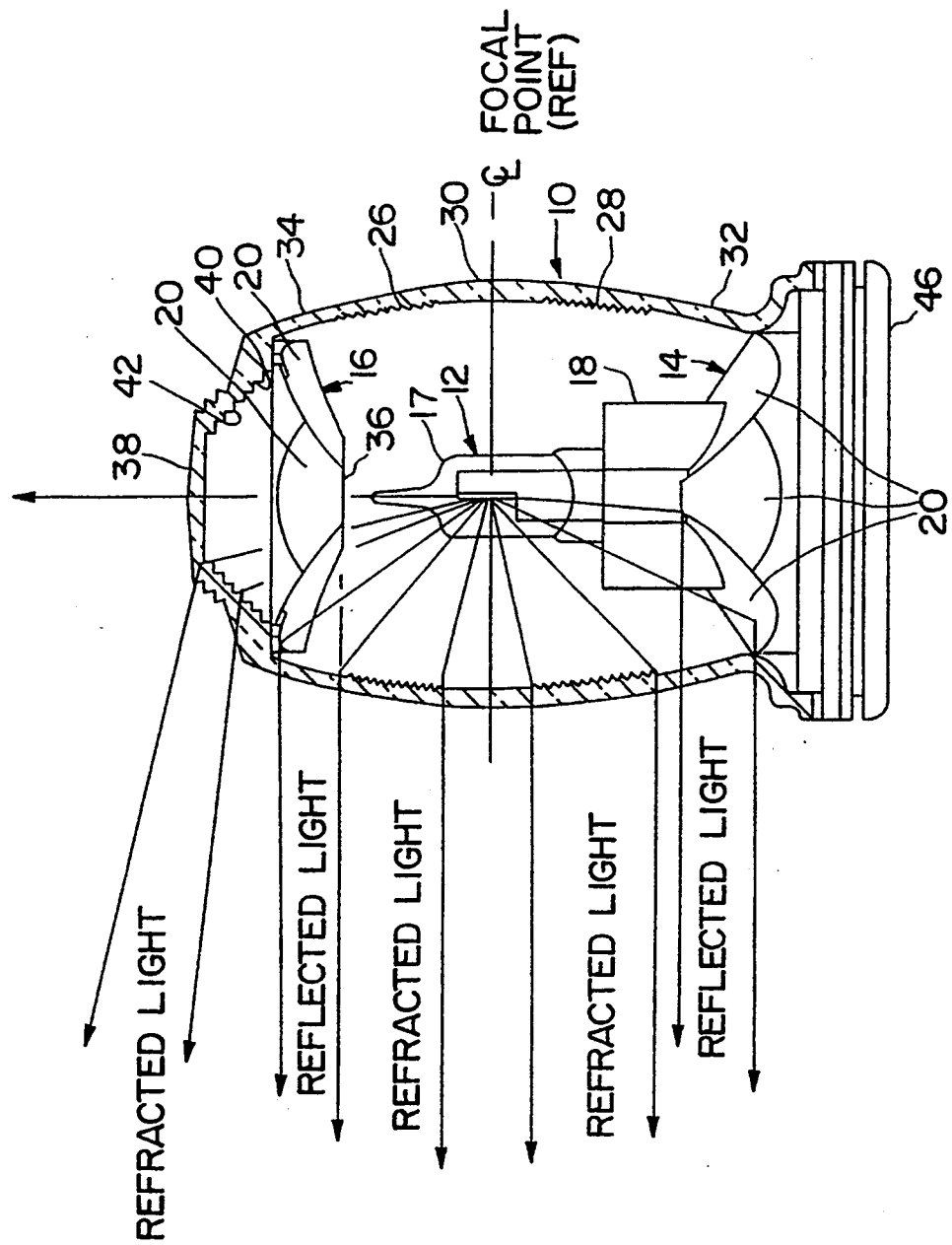
FIG. 1 is a cross-sectional, side elevation view of a light assembly in accordance with a first embodiment of the present invention, the light assembly of FIG. 1 employing an incandescent lamp as the light source.

With reference now to FIG. 1, a light assembly in accordance with a first embodiment of the present invention generally comprises a lens cover 10, a light source 12 and a pair of reflectors which are indicated generally at 14 and 16. The lens cover 10 of this first embodiment is generally "barrel" shaped and thus, when viewed in cross-section in a horizontal plane oriented transversely to the FIG. 1 showing, is circular and defines a central axis. As the light assembly is shown in FIGS. 1 and 2, this central axis is vertically oriented.

Figure 2:
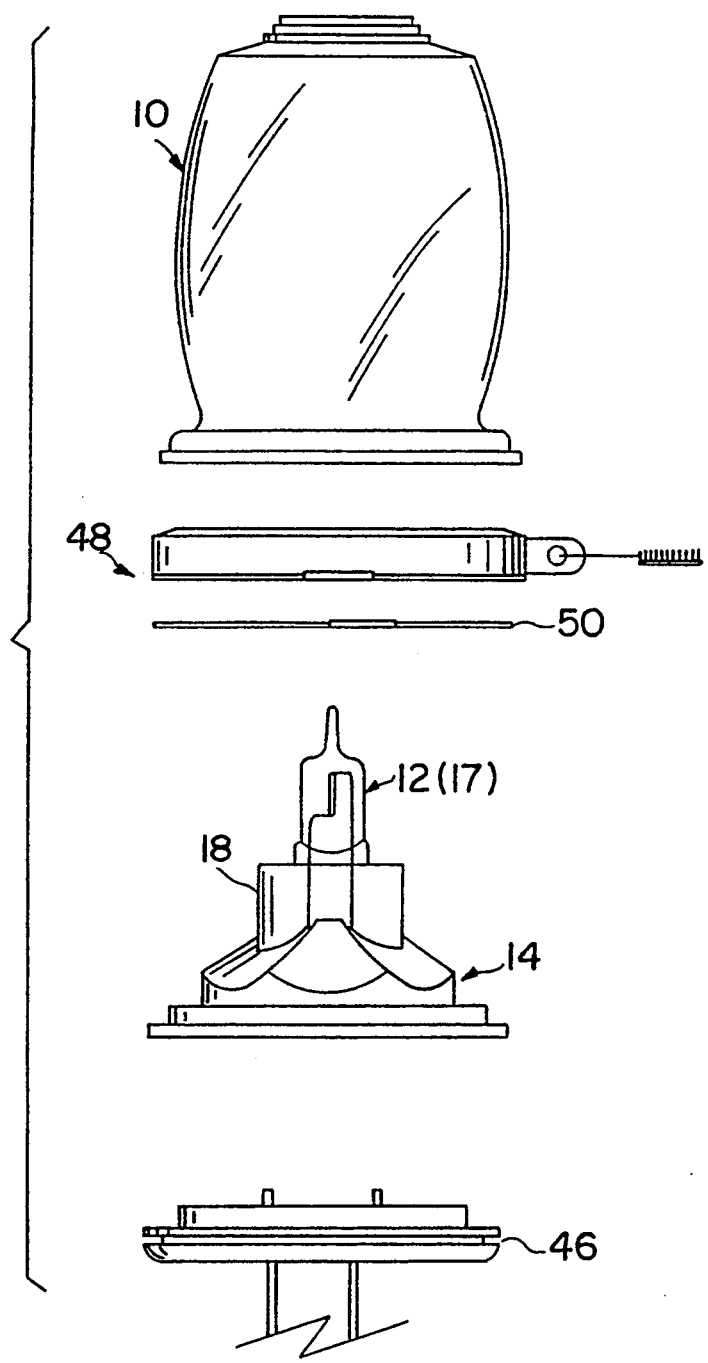
FIG. 2 is an exploded side elevation view of the light assembly of FIG. 1, FIG. 2 depicting the light assembly as it might be disassembled for installation or servicing.

The light source 12, in the embodiment depicted in FIGS. 1 and 2, comprises an incandescent lamp 17, namely a halogen lamp. This lamp is mounted in a socket or lamp holder 18 which, preferably, is formed integrally with the lower reflector 14. The lamp holder 18 is sized and configured to insure that the filament of lamp 17 will be located on the central axis of the lens cover.

Figure 4:
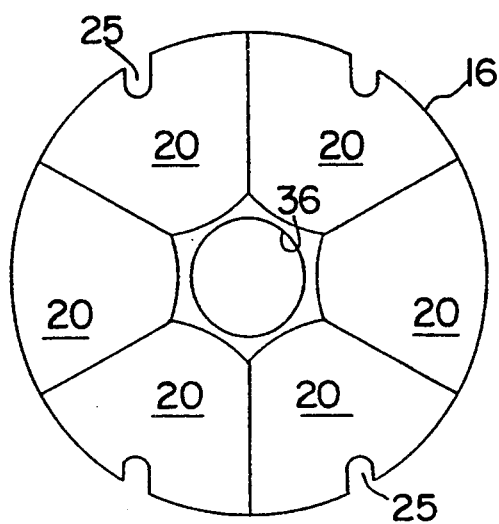
FIG. 4 is a bottom plan view of the reflector of FIG. 3.

The reflectors 14 and 16, as can best be seen by simultaneous consideration of FIGS. 1 and 4, each define plural parabolic reflective surfaces or quadrants 20. In one reduction to practice of the invention, each of the reflectors 14 and 16 included six quadrants, i.e., six reflective surfaces 20. The six surfaces 20 of each reflector are portions of paraboloids of revolution. The upper and lower reflectors 14 and 16, however, do not have to be the same size. The paraboloids of revolution of the surfaces 20 share a common focal point. In a typical reduction to practice, the focal length of the paraboloids of revolution of the surfaces 20 of reflector 14 will be longer than the focal length of the paraboloids of revolution of the surfaces 20 of reflector 16. In the embodiment of FIGS. 1 and 2, the common focal points of the parabolic surfaces 20 of reflectors 14 and 16 will, to the extent possible taking manufacturing tolerances into account, coincide and will lie on the central axis of the lens cover in the region occupied by the filament of the lamp 17, i.e., at a reference focal point. Accordingly, a large portion of the light emitted by lamp 17 and incident on a reflective surface 20 of either of reflectors 14 or 16 will be reflected in a direction which is generally transverse to the central axis of the lens cover 10 as indicated by arrows on FIG. 1.

Figure 3:
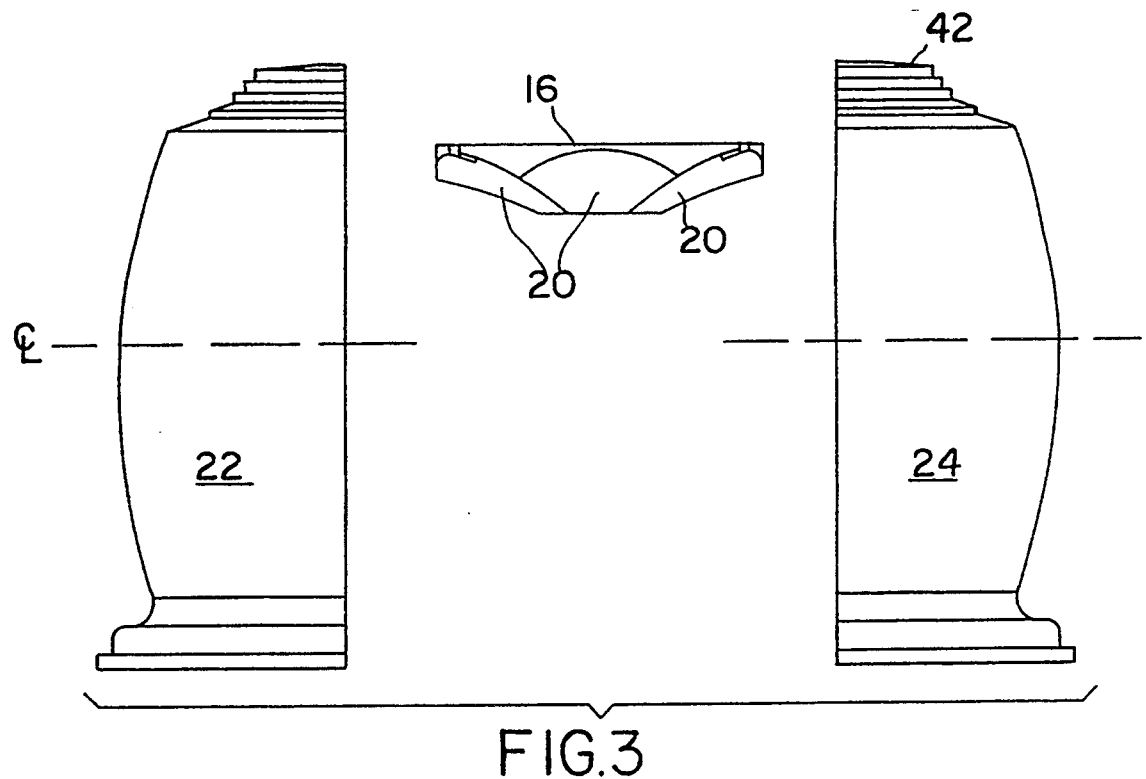
FIG. 3 is an exploded view which depicts the two halves of the lens cover of the embodiment of FIGS. 1 and 2 and the upper reflector prior to the integration thereof into a unitary subassembly.

As may be seen from FIG. 3, the lens cover 10 is formed as two molded halves 22 and 24 which are ultrasonically welded together. The lens cover halves 22 and 24 are provided internally with a plurality of spaced bosses. The upper reflector 16, as may be seen from FIG. 4, is provided with a plurality of cut-outs 25 about its periphery. The cut-outs 25 are sized and spaced to receive the bosses on the lens cover halves. The upper reflector 16, when employed, is positioned between the lens cover halves before they are welded together and the welding operation permanently captures the upper reflector within the lens cover.

Continuing to discuss the lens cover 10, the outer side surface thereof, with the exception of a region immediately adjacent the top of the cover in the embodiments of FIGS. 1-5, is smooth. This smooth outer surface facilitates cleaning and minimizes the accumulation of dirt which would reduce the intensity of the emitted light. The lens cover 10 of the embodiments of FIGS. 1-5 is provided with spacially displaced upper and lower inner optics, respectively indicated at 26 and 28. The inner optics are defined by arrays of circumferential prismatic surfaces. The prismatic surfaces of each array are individually sized and shaped to refract light emitted from source 12 in the manner depicted in FIGS. 1 and 5. Thus, light emanating from source 12 and directly incident on the inner optics 26, 28 is redirected so as to also be transmitted in a desired direction. In the disclosed embodiments, that direction is transverse to the central axis of the lens cover 10. The curvature of the lens cover is selected to reduce internal reflection from surfaces of the prisms of the internal optics.

The upper and lower arrays of prismatic surfaces, i.e., the upper and lower inner optics 26 and 28, are separated by a transparent intermediate region 30 which, in the disclosed embodiments, is in horizontal registration with the light source 12. Accordingly, light emitted by the source and traveling in a direction which is generally transverse to the central axis of the lens cover, or at an angle which is shallow relative to a plane transverse to the central axis, will not undergo any significant refraction and thus will also be radiated in planes which are transverse to the central axis of the lens cover. The lens cover is further provided with transparent regions 32 and 34 which are respectively in registration with the reflectors 14 and 16 and thus light reflected in the manner described above will also pass through the lens cover without significant refraction. The lens cover 10 can be keyed to the lower reflector-lampholder subassembly 14, 18 so as to achieve a predetermined relationship between the orientation of the reflectors 14 and 16 if deemed necessary or desirable. For the typical application, however, no such predetermined relationship has been found to be necessary.

In the embodiments of FIGS. 1-5, the upper reflector 16 is provided with a central opening 36 which is coaxial with the lens cover 10 and, accordingly, in vertical alignment with the light source 12. Light emitted by source 12 and traveling upwardly at a shallow angle relative to the axis of the lens cover will pass through opening 36 and through the transparent top 38 of the lens cover 10. The lens cover 10 is further provided, in the upper portion thereof which extends between the transparent top 38 and the upwardly facing side of reflector 16, with both inner and outer optics, respectively indicated at 40 and 42, comprised of circumferential prismatic surfaces. The prismatic surfaces which define optics 40 and 42 redirect some of the light which is transmitted through the opening 36. Accordingly, in the embodiments of FIGS. 1-5 a small fraction of the generated light will be radiated both axially with respect to the lens cover and also angularly upwardly as a result of redirection caused by the inner and outer optics 40, 42. The opening 36 may, however, be omitted or the lens cover 10 may be provided with a further internal reflector and associated optics which will redirect light passing through the opening 36 in a desired direction.

The invention has also been reduced to practice with the upper reflector 16 omitted. In such case, employing the same lens cover as described above and shown in FIGS. 1 and 5, a greater portion of the light generated by source 12 will be radiated angularly upwardly when compared to the FIG. 1 embodiment where the radiated light is concentrated in planes which are oriented transversely relative to the lens cover central axis.

Figure 5:
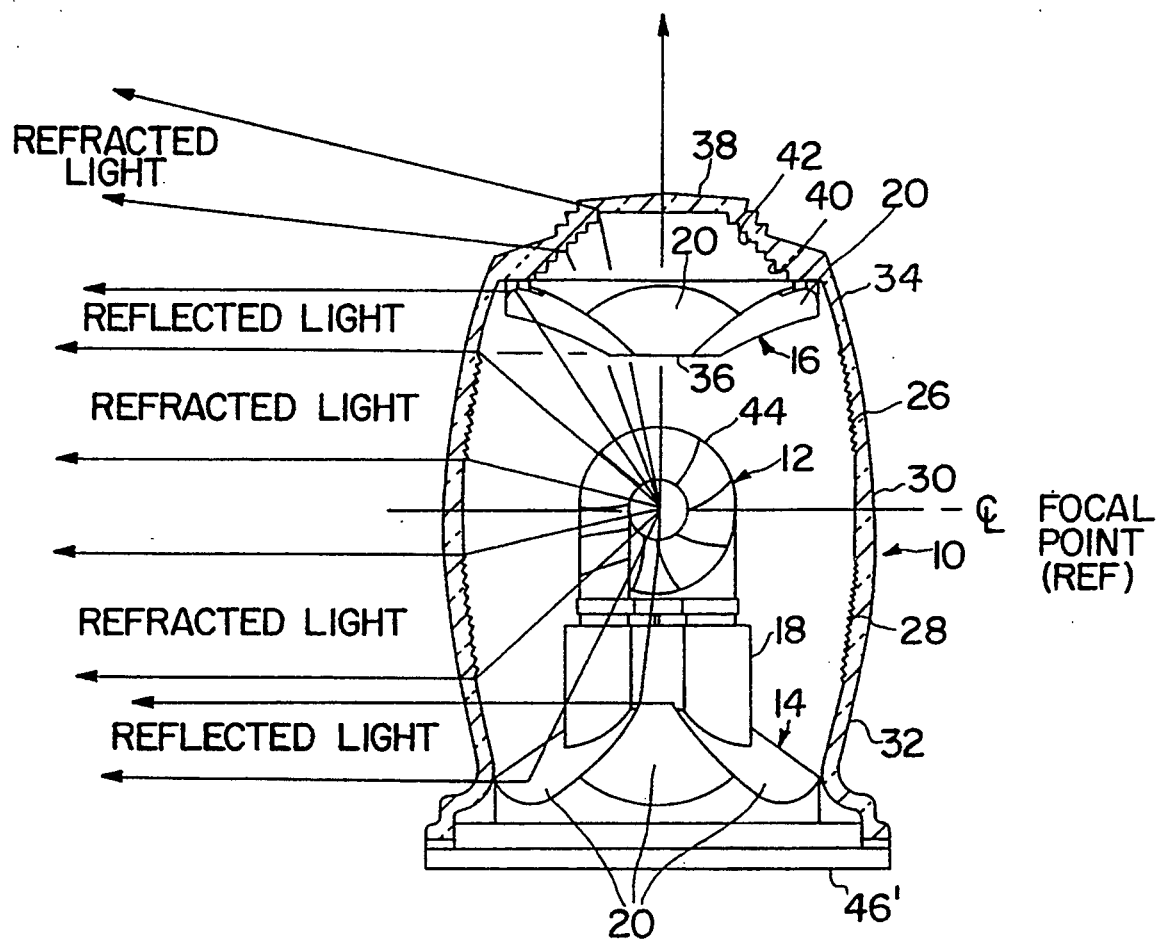
FIG. 5 is a view similar to FIG. 1 which depicts the use of a gaseous discharge tube as the light source.
Figure 6:
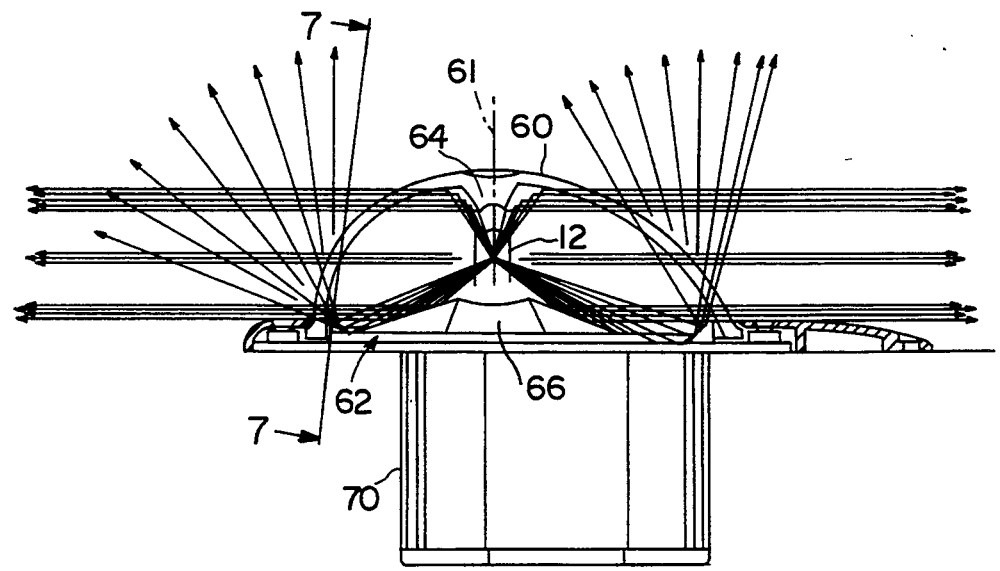
FIG. 6 is a schematic side elevation view, partly in section, of a second embodiment of a light assembly in accordance with the invention.
Figure 7:
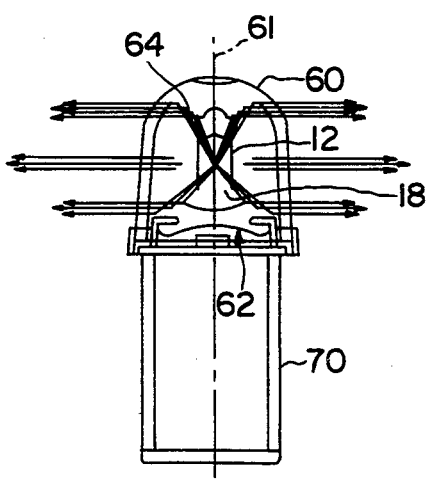
FIG. 7 is a cross-sectional view, taken along line 7—7 of FIG. 6, of the light assembly of FIG. 6.
Figure 8:
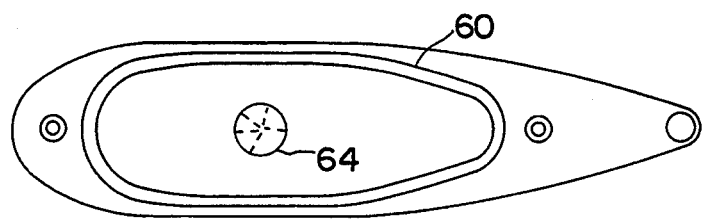
FIG. 8 is a top view of the light of FIG. 6.
Figure 9:
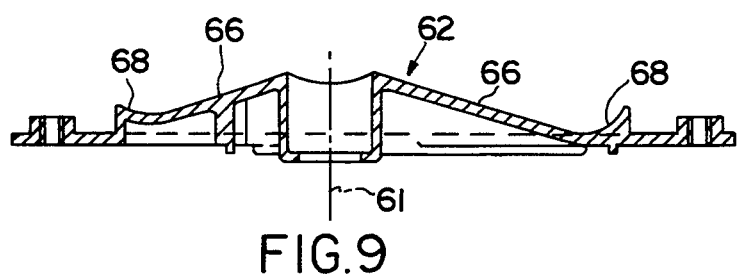
FIG. 9 is a cross-sectional side elevation view of the lower reflector of the light of FIG. 6.

FIG. 5 is a view similar to FIG. 1 but showing the present invention employing a Xenon flash tube 44 as the light source 12. The only difference between the embodiments of FIGS. 1 and 5 is that, in the case of the FIG. 1 embodiment, the mounting base 46 is slightly larger when compared to the mounting base 46' of the FIG. 5 embodiment. The mounting base 46 of the FIG. 1 embodiment will accommodate a circuit board which includes the switching circuitry for causing the incandescent lamp to flash. The embodiment of FIG. 1, accordingly, requires only two conductors for supplying the requisite electrical energy for operation and can be directly substituted for a rotating beacon type anti-collision light without any rewiring of the air frame. In the embodiment of FIG. 5, the trigger transformer for the flash tube is mounted within the lower reflector 14. The FIG. 5 embodiment, of course, requires a three conductor cable for causing periodic energization of the flash tube.

Referring again to FIG. 2, the assembly of the components into a lamp assembly is accomplished through the use of a clamp subassembly which is indicated generally at 48. The three subsystems which must be assembled to define a lamp in accordance with the invention comprise the lens cover 10, which may include an upper reflector 16, the lower reflector subassembly which includes the reflector 14 and its integral light source support 18 with a light generator 12 mounted therein, and the mounting base 46. A gasket 50 will be positioned between lens cover 10 and a peripheral flange on the lower reflector subassembly to hermetically seal the interior of the lens cover from the ambient atmosphere.

Referring now to FIGS. 6-9, another embodiment of a light assembly in accordance with the present invention includes a lens cover 60 characterized by a "teardrop" shape, i.e., the lens cover 60 is aerodynamically designed to reduce its wind resistance. The lens cover 60 does not have internal optics but does define a vertical axis 61 which extends through the lower and upper segmented reflectors 62 and 64. The lower reflector 62 could be shaped and located in the same manner as described above in the case of the embodiment of FIGS. 1-5. However, in the disclosed embodiment, the parabolic reflective surfaces 66 of reflector 62, i.e., the reflector segments which extend outwardly from the base of the light source holder, are segments of a parabolic trough. Restated, the surfaces 66 are parabolic in one plane only. Additionally, reflective surfaces 66 merge into peripheral reflective surfaces 68 located at the ends of reflective surfaces 66 which are disposed the greatest distance from axis 61. Reflective surfaces 68, in the disclosed embodiment, have spherical surfaces which are tangent to the adjacent parabolic surfaces. These spherical surfaces, as may be seen from FIG. 6, redirect incident light generally upwardly. The light source of the embodiment of FIGS. 6-9 is supported and positioned in the manner discussed above in the description of FIGS. 1-5.

A significant difference between the embodiment of FIGS. 6-9 and that of FIGS. 1-5 resides in the fact that, in the case of the streamlined light of FIGS. 6-9, the lens housing 60 is a unitary molded part rather than being comprised of two halves which are subsequently bonded to one another. Also, in the case of the embodiment of FIGS. 6-9, the upper reflector 64 is formed by molding the segmented reflector shape as part of the lens cover 60. After being removed from the mold, the interior of the lens cover is masked with the exception of the portions which are to define the segmented upper reflector and the reflector is completed by metallizing the plural parabolic surfaces thereof.

The light of the embodiment of FIGS. 6-9 is characterized by being very streamlined and compact. Accordingly, there will typically not be enough space within the cavity defined by the underside of the lower reflector 62 to accomodate the circuitry which causes the light source to flash. Thus, the embodiment of FIGS. 6–9 is provided with a lower housing 70 which typically will be recessed beneath the outer surface of the aircraft.

While preferred embodiments have been shown and described, various modifications and substitutions may be made thereto without departing from the spirit and scope of the invention. Accordingly, it will be understood that the present invention has been described by way of illustration and not limitation.

What Is claimed

1. Apparatus for producing pulses of light in the visible spectrum comprising:

a light generator, said light generator having a light emitting region from which light rays are radiated when the light generator is in a energized state;

light transmissive cover means;

means for supporting said light generator within said cover means, said supporting means positioning said light generator so that a portion of the light emitting region thereof lies on an axis;

first reflector means positioned within said cover means on a first side of said light generator for intercepting and redirecting light rays radiating from said light generator, said first reflector means comprising a plurality of parabolic reflective surfaces, said reflective surfaces having a common focal point and being arranged about said axis, said common focal point being located approximately on said axis whereby light rays incident on said first reflector means parabolic surfaces will be redirected in directions which are generally transverse to said axis; and second reflector means positioned within said cover means for intercepting light rays radiating from said light generator, said second reflector means comprising a plurality of parabolic reflective surfaces, said reflective surfaces of said second reflector means having a common focal point and being arranged about said axis, said common focal point of said second reflector means parabolic reflective surfaces being located approximately on said axis and approximately coincident with said focal point of said first reflector means whereby light rays incident on said second reflector means parabolic reflector surfaces will be redirected in directions which are generally parallel to the directions of the light rays redirected by said first reflector means, said second reflector means being located along said axis at a second side light generator and in a generally facing relationship to said first reflector means.

2. The apparatus of claim 1 wherein said first reflector means is integral with said light generator supporting means.

3. The apparatus of claim 2 wherein aid second reflector means is integral with said cover means.

4. The apparatus of claim 3 wherein said light generator is an incandescent lamp.

5. The apparatus of claim 3 wherein said light generator is a gaseous discharge tube.

6. The apparatus of claim 1 wherein said light generator is an incandescent lamp.

7. The apparatus of claim 6 wherein said first reflector means defines a base with an internal cavity and wherein circuitry for periodically interrupting the energization of said incandescent lamp is positioned within said cavity.

8. The apparatus of claim 7 wherein said first reflector means is integral with said light generator supporting means.

9. The apparatus of claim 1 wherein said light generator is a gaseous discharge tube.

10. The apparatus of claim 1 wherein said second reflector means is integral with said cover means.

11. The apparatus of claim 1 wherein said parabolic reflective surfaces define portions of paraboloids of revolution, each of said paraboloids of revolution having a focal length, and wherein the focal lengths of the paraboloids of revolution of said firstctor means are all the same and are different from the focal lengths of the paraboloids of revolution said second reflector means.

12. The apparatus of claim 1 wherein said parabolic reflective surfaces of said first reflector means are segments of parabolic trough reflectors.

13. The apparatus of claim 12 wherein said parabolic reflective surfaces of said second reflector means define portions of paraboloids of revolution.

14. The apparatus of claim 12 wherein said reflective surface of said first reflector means extend generally outwardly with respect to said axis to outer ends thereof, and wherein said apparatus further comprises:

reflective extensions of at lest some of said parabolic reflective surfaces of said first reflector means, said extensions being disposed at the said outer ends of said surfaces, said extensions being shaped to reflect light incident thereon in directions which are angularly related to said transverse directions.

15. The apparatus of claim 14 wherein said reflective extensions have a generally spherical shape.

16. The apparatus of claim 14 wherein said second reflector means is integral with said cover means.

17. The apparatus of claim 14 wherein said parabolic reflective surfaces of said second reflector means define portions of paraboloids of revolution.

18. The apparatus of claim 17 wherein said second reflector means is integral with said cover means.

19. The apparatus of claim 1 wherein said reflective surface of said first reflector means extend generally outwardly with respect to said axis to outer ends thereof, and wherein said apparatus further comprises:

reflective extensions of at least some of said parabolic reflective surfaces of said first reflector means, said extensions being disposed at the said outer ends of said surfaces, said extensions being shaped to reflect light incident thereon in directions which are angularly related to said transverse directions.

20. The apparatus of claim 19 wherein said reflective extensions have a generally spherical shape.

* * * * *